United States Patent
Bossmann et al.

(10) Patent No.: US 6,402,476 B1
(45) Date of Patent: Jun. 11, 2002

(54) TURBINE BLADE AND A METHOD FOR ITS PRODUCTION

(75) Inventors: Hans-Peter Bossmann, Wiesloch; Otto-Ernst Bernhardi, Bad Schönborn; Hans-Joachim Schmutzler, Maikammer; Harald Reiss, Heidelberg; Raiko Milanovic, Heidelberg; Ludwig Weiler, Heidelberg; Christoph Sommer, Plankstadt; Marianne Sommer, Sandhausen, all of (DE)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/621,906

(22) Filed: Jul. 24, 2000

(51) Int. Cl.$^7$ ................................................. F01D 5/14
(52) U.S. Cl. ................... 416/241 R; 427/275; 427/318; 427/556
(58) Field of Search ................... 416/229 R, 229 A, 416/241 R; 427/556, 318, 275; 428/637; 148/902, 903, 403, 512

(56) References Cited

U.S. PATENT DOCUMENTS

| | | | | |
|---|---|---|---|---|
| 4,122,240 A | * | 10/1978 | Banas et al. | 428/655 |
| 4,746,540 A | * | 5/1988 | Kawasaki et al. | 427/53.1 |
| 4,834,806 A | * | 5/1989 | Hashimoto et al. | 148/4 |
| 5,914,059 A | * | 6/1999 | Marcin, Jr. et al. | 219/121.66 |
| 5,952,057 A | * | 9/1999 | Parks | 427/554 |
| 5,961,861 A | * | 10/1999 | McCay et al. | 219/121.83 |
| 6,024,792 A | * | 2/2000 | Kurz et al. | 117/9 |

* cited by examiner

Primary Examiner—Edward K. Look
Assistant Examiner—Ninh Nguyen
(74) Attorney, Agent, or Firm—Laurence A. Greenberg; Werner H. Stemer; Gregory L. Mayback

(57) ABSTRACT

A turbine blade and a method for its production. In order to protect the turbine blade from being damaged by particles carried in the gas, surfaces of the turbine blade are melted down to a predetermined depth in order to form a defined amorphous region on a crystalline structure of a base material. The surfaces are then cooled down at a predetermined temperature reduction rate per unit time.

14 Claims, 1 Drawing Sheet

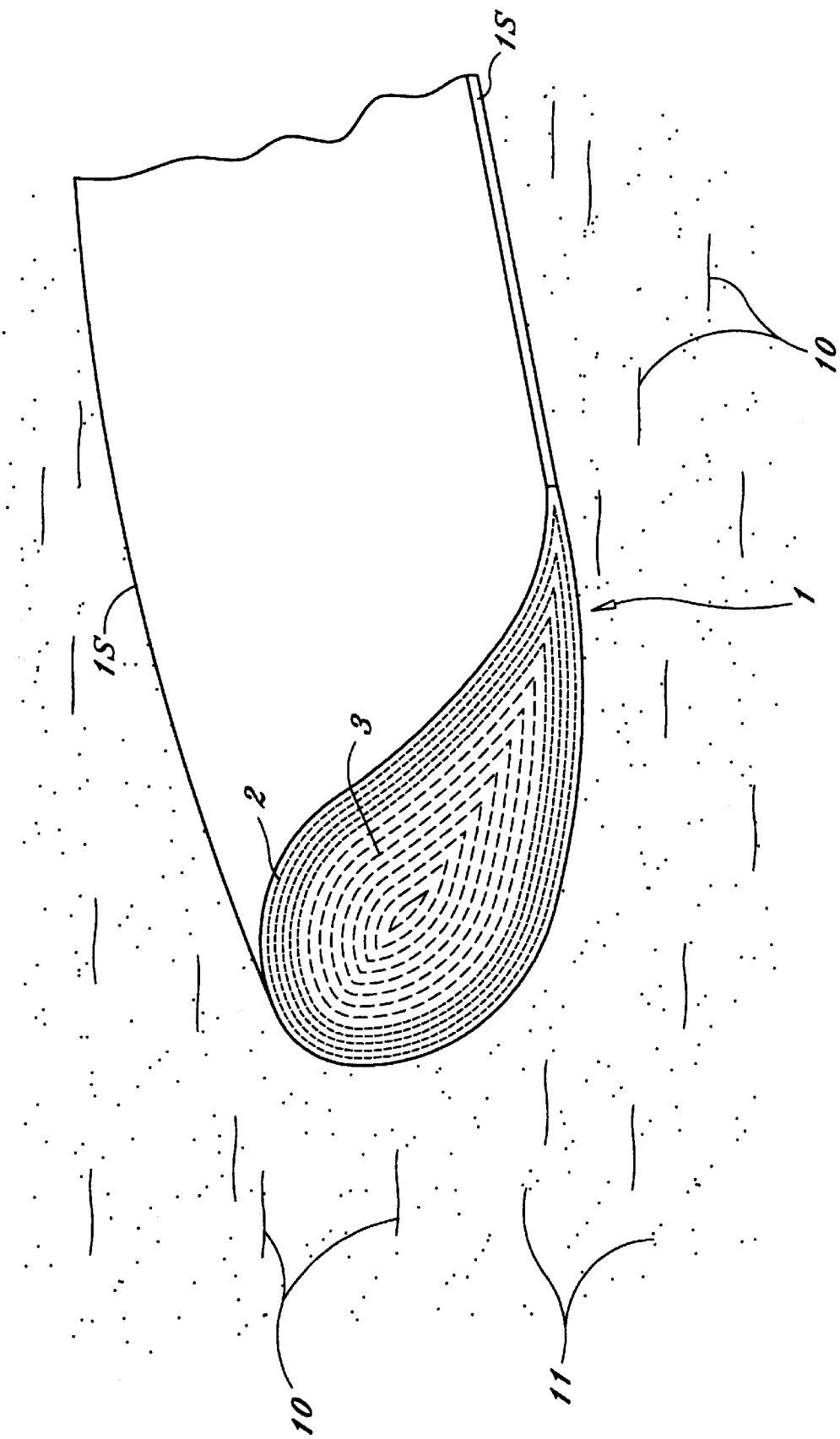

TURBINE BLADE AND A METHOD FOR ITS PRODUCTION

BACKGROUND OF THE INVENTION

Field of the Invention

The invention relates to a method for producing a turbine blade from a nickel-based alloy for a gas turbine.

In order to drive gas turbines, hot combustion gases are applied directly to turbine blades. In the process, they are subject to both thermal and mechanical stresses during operation of the gas turbine. Particles that are carried by the hot gases and can be produced, for example, by erosion of ceramic combustion chamber linings, travel at considerable speeds so that they are able to remove material from the surfaces of the turbine blades, by striking the blade surface. In very poor conditions, the loss of material may be so great that the turbine blades-are no longer fully serviceable after just a few months.

SUMMARY OF THE INVENTION

It is accordingly an object of the invention to provide a turbine blade and a method for its production that overcome the above-mentioned disadvantages of the prior art devices and methods of this general type, whose surfaces are optimally protected against the removal of material.

With the foregoing and other objects in view there is provided, in accordance with the invention, a method for producing a turbine blade for a gas turbine. The method includes the step of: forming an initial turbine blade from a nickel-based alloy; melting down surfaces of the initial turbine blade to a predetermined depth for forming a defined amorphous region on a crystalline structure of the nickel-based alloy; and cooling down the surfaces at a predetermined temperature reduction rate per unit time.

The turbine blade according to the invention is initially manufactured from a nickel-based alloy, in a manner known per se. Its surfaces are then melted with the beam, for example of a $CO_2$ laser, down to a depth of 0.001 to 3 mm. The liquefied material is then cooled down again at a cooling rate of $10^{10}$ to $10^{15}$ K/s, by switching off the radiation source or by additional cooling measures.

This high cooling rate results in the surface of the turbine blade being provided with an amorphous solid structure on the side facing the hot gas. Furthermore, by appropriate selection of the cooling rate, the amorphous structure can be provided with closed pores. The amorphous structure merges smoothly and to a greater extent into the original crystalline structure of the base alloy, the greater the distance from the blade surface. The transition to the liquid state ensures that no discontinuous, abrupt boundary surfaces, which could lead to the well known separation of layers in conventional blade coatings, are formed between the amorphous structure and the original, crystalline structure of the nickel-based material, which is not changed or is changed only gradually by the laser radiation. The laser modification thus gives the surfaces treated in this way the character of gradient layers with continuous, non abrupt transitions from an amorphous structure to the original crystalline structure underneath it. It thus requires no additional, adhesion-promoting intermediate layers, which are required in conventional blade coatings in order to improve the adhesion of thermal insulation layers placed above.

The amorphous layer also has the character of a functional layer, since the structural and material composition of the layer is optimized to avoid particle impact erosion. The radiation intensity, its duration, the cooling rate and a supply of material which can also be provided during the melting process and is described below are chosen such that, once it has solidified, the amorphous structure has as high a ratio as possible of elastic to plastic deformation. At the same time, the energy transferred on particle impact is intended to be locally absorbed to a sufficient extent to prevent the removal of material at the impact point, and the propagation of compression zones and pressure waves into the blade material away from the impact point.

The radiation intensity and its duration must be chosen so as to ensure that the surface melts within microseconds down to a depth of 0.001 to 3 mm. Both parameters thus depend on the radiation absorbence and the thermal conductivity of the blade material in the solid state, and then in the liquid state. These parameters are defined on the basis of known heat transfer rules, taking account of phase changes, that is to say the progress of a melting zone front into the depth of the blade material, and subsequent convection of the liquid components under the influence of the laser radiation. The cooling rate is governed by the solidification behavior of the blade material and the solidification behavior of additional materials (as described below) which can be added during the melting process. For nickel-based materials, it is advantageously in the range of $10^{10}$ to $10^{15}$ K/s.

Initially, the amorphous structure is in principle suitable for absorption of the particle impact energy due to a high level of local damping of the mechanical oscillation energy transferred on impact. Owing to the regular lattice structure, a crystalline solid-state lattice, on the other hand, would assist the propagation of pressure waves, which can lead to material being able to separate directly underneath the impact point as well as away from this damage, if the impact energy transferred into it there is greater than the binding energy of the solid-state components which form the blade material.

This characteristic of the amorphous layer can be optimized by adding further materials to the melted base material during the process of producing it, in order to form alloys, cermets, or mixed ceramics. Such materials may be added in the form of strips, wires, powders, fibers, or from the gas phase. Any materials that have a high ratio by weight of cations to anions may be used for this purpose, such as zirconium dioxide, barium oxide, titanium oxide or yttrium oxide, or other ceramics whose thermal conductivity is poor and which are stable at high temperatures.

The amorphous surfaces formed in this way may also have a large number of closed pores down to their depth of 0.001 to 3 mm. Such pores can assist in further reducing the propagation of pressure waves in the solid material, since they damp such waves by multiple reflection on the pore structures and/or cell structures. Such, structures have highly different mechanical (elastic) constants, which lead to a high level of dispersion of the mechanical oscillations and pressure waves, and thus to their absorption. The closed pores thus help in preventing particle impact erosion since they break down the impact energy directly at or under the impact point. Since porous solid bodies or solid layers also have a lower thermal conductivity than homogeneous solid bodies or solid layers, the amorphous, porous structure close to the blade surface will also act as a heat insulation layer.

Pores are formed when the vapor pressure of the base material and the vapor pressure of the additional materials at the temperatures achieved during the process of melting the blade surface are sufficiently high that they exceed the respective liquid pressure and the pressure caused by the surface tension of the liquid material and which, overall, acts on a bubble. The high vapor pressure results in bubbles or other catheters that cause the amorphous layer to have a porous structure. Suitable additives include, for example, metals in the form of mercury, cesium, potassium, sodium or lithium, which have a considerably lower melting point than the nickel-based material. If the cooling down process is very rapid, then this prevents not only the recrystallization of the base material and of the materials which have been additionally fed in, or the alloys which are formed from the base material and the additives, but also prevents collapse of the bubble-like structure components and the liquid material merging once again to form a homogeneous (amorphous) solid body. The production of the pores is assisted by ensuring a high level of convection of the liquid material during the melting process, by correspondingly lengthening the irradiation duration. This results in improved mixing of the base material and of the materials fed in.

Closed pores are formed when the molten materials are cooled down very quickly. In this case, it is impossible for gas to be transported into the surface, and it is thus impossible for oxides or oxide layers to be formed in the depth of the surface, which could lead to separation of surface components if they were to grow beyond a critical thickness or increase in volume.

With the foregoing and other objects in view there is further provided, in accordance with the invention, a turbine blade for a gas turbine. The turbine blade includes a turbine blade body formed of a nickel-based alloy that has an inner region. The turbine blade body includes surfaces with an amorphous structure having a thickness in a range of 0.001 to 3 mm on sides to face a combustion gas; and a crystalline structure adjacent the inner region of the turbine blade body.

Other features which are considered as characteristic for the invention are set forth in the appended claims.

Although the invention is illustrated and described herein as embodied in a turbine blade and a method for its production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single figure of the drawing is a fragmented, partially magnified, front-elevational view of a turbine blade which is a component of a gas turbine.

DESCRIPTION OF THE PREFERRED EMBODIMENTS

Referring now to the single figure of the drawing in detail, there is shown a turbine blade 1 which is subjected directly to combustion gases 10 in a non-illustrated gas turbine, and thus also to solid particles 11 which are carried in the gas 10. The turbine blade 1 is protected against being damaged by the particles 11, since these particles 11 strike surfaces 1S of the turbine blade 1 at a very high speed. To this end, the surfaces 1S of the turbine blade 1 are formed in a special way. As can be seen from the figure, the surfaces 1S have an amorphous structure 2 facing the combustion gas 10 which merges smoothly into a crystalline structure 3 which continues inwards. In order to form the amorphous structure 2, the surfaces 1S are initially melted by a beam of a $CO_2$ laser down to a depth of 0.001 to 3 mm, and are then cooled down again at $10^{10}$ to $10^{15}$ K/s. A thickness of the amorphous structure 2 produced in this way corresponds approximately to the depth of melting. This merges smoothly into the original, crystalline structure 3 of a base material located underneath. By feeding materials into a mold, it is also possible to form a new, deeper, crystalline layer in the form of an alloy, into which the amorphous layer close to the surface merges smoothly.

According to the invention, it is possible to add material to the surfaces during the melting process in order, for example, to form an alloy, a cermet or a mixed ceramic composed of the molten nickel-base, alloy and the added material on the turbine blade 1, down to a depth of 0.001 mm to 3 mm. The additional material can be chosen such that the alloys, the cermets or the mixed ceramics have poor thermal conduction characteristics.

By way of example, materials having a high ratio of cations to anions by weight, such as zirconium dioxide, barium oxide, titanium oxide or yttrium oxide, are suitable for use as the additional materials which are intended to promote as high a ratio as possible of elastic to plastic deformation of the amorphous structure, and thus resistance to particle impact erosion. According, to the invention, the structure 2 is intended to have closed pores (not shown here). When closed pores are present, the gas 10 cannot penetrate into the surfaces 1S. The pores are preferably formed when materials in the form of mercury, cesium, potassium and/or lithium are added during the process of melting the surfaces 1S, and the surfaces of the turbine blade 1 are then cooled very rapidly. The additional materials may be added in the form of strips, wires, powders, fibers or from the gas phase during the process of melting the surfaces 1S. The rapid cooling process thus results in an amorphous layer having a material composition that differs from that of the nickel-based material.

This may either merge smoothly into the nickel-based material or enter a crystalline layer, which is likewise formed by an alloy etc. However, owing to the greater distance from the surface, the crystalline layer is not subject to the full, high cooling rates of the regions close to the surface, but cools down more slowly owing to the thermal coupling to the thermal capacity of the base material of the blade, and owing to the lack of radiation losses to the area around the blade, thus allowing crystal growth before this region likewise solidifies. The original nickel-based material is then located underneath. To this end, the transition from a crystalline alloy layer to the crystalline structure of the unalloyed base material is once again gradual.

In order to improve the protection for very severely stressed turbine blades 1, it may be worthwhile, once the surface 1S treated with the beam of a $CO_2$ laser has solidified, to melt the surface is once again and to cool it down again at a predetermined temperature rate per unit time.

We claim:

1. A method for producing a turbine blade for a gas turbine, which comprises the steps of:
   forming an initial turbine blade from a nickel-based alloy;
   melting down surfaces of the initial turbine blade to a predetermined depth for forming a defined amorphous region on a crystalline structure of the nickel-based alloy; and cooling down the surfaces at a predetermined temperature reduction rate pet unit time to prevent re-crystallization.

2. The method according to claim 1, which comprises:

during the melting step, melting down the surfaces that will face a combustion gas to a depth of 0.001 to 3 mm with a beam of a $CO_2$ laser for forming the defined amorphous structure on the crystalline structure of the nickel-based alloy; and cooling down the surfaces at a rate of $10^{10}$ to $10^{15}$ K/s.

3. The method according to claim 1, which comprises feeding in at least one more additional material during the step of melting down the surfaces to the predetermined depth for forming the defined amorphous structure with closed pores on the crystalline structure of the nickel-based alloy on sides of the turbine blade that will face a combustion gas.

4. The method according to claim 1, which comprises:

during the melting step, feeding in at least one more additional material, the surfaces are melted down to a depth of 0.001 to 3 mm with a beam of a $CO_2$ laser for forming the defined amorphous structure on the crystalline structure of the nickel-based alloy; and cooling down the surfaces at a rate of $10^{10}$ to $10^{15}$ K/s.

5. The method according to claim 1, which comprises:

during the melting step, feeding in at least one additional material having a high ratio of cations to an anion weight, the surfaces are melted down to a depth of 0.001 to 3 mm with a beam of a $CO_2$ laser for forming the defined amorphous structure on the crystalline structure of the nickel-based alloy on sides to face a combustion gas; and cooling down the surfaces at a rate of $10^{10}$ to $10^{15}$ K/s.

6. The method according to claim 5, which comprises selecting the at least one additional material from the group consisting of zirconium dioxide, barium oxide, titanium oxide and yttrium oxide.

7. The method according to claim 6, which comprises:

during the melting step, feeding in at least one further additional material selected from the group consisting of mercury, cesium potassium and lithium, the surfaces are melted down to the depth of 0.001 to 3 mm with the beam of the $CO_2$ laser to form the defined amorphous structure on the crystalline structure of the nickel-based alloy on the sides to face the combustion gas, the melting step resulting in a liquefied base material, a liquefied additional material and a liquefied further additional material;

convection mixing of the liquefied base material, the liquefied additional material and the liquefied further additional material resulting in a mixed liquid material; and cooling down the mixed liquid material at a rate of $10^{10}$ to $10^{15}$ K/s.

8. The method according to claim 5, which comprises selecting the at least one additional material from the group consisting of mercury, cesium, potassium and lithium.

9. The method according to claim 1, which comprises:

during the melting step, feeding in additional materials having a high vapor pressure when they melt, the surfaces are melted down to a depth of 0.001 to 3 mm with a beam of a $CO_2$ laser for forming the defined amorphous structure on the crystalline structure of the nickel-based alloy on sides facing a combustion gas, the melting step resulting in liquefied additional materials and a liquefied base material;

convention mixing of the liquefied additional materials and the liquefied base material resulting in a mixed liquefied material; and cooling down the mixed liquid material at a rate of $10^{10}$ to $10^{15}$ K/s.

10. A turbine blade for a gas turbine, comprising:

a turbine blade body formed of a nickel-based alloy and having an inner region, said turbine blade body including:

surfaces with an amorphous structure having a thickness in a range of 0.001 to 3 mm on sides to face a combustion gas; and a crystalline structure adjacent said inner region of said turbine blade body.

11. A method for producing a turbine blade for a gas turbine, which comprises the steps of:

forming an initial turbine blade from a nickel-based alloy;

melting down surfaces of the initial turbine blade to a predetermined depth and feeding in at least one additional material selected from the group consisting of a material having a high ratio of cations to an anion weight and a material having a high vapor pressure when melting, for forming a defined amorphous region on a crystalline structure of the nickel-based alloy; and cooling down the surfaces at a predetermined temperature reduction rate per unit time to prevent re-crystallization.

12. The method according to claim 11, wherein the predetermined depth for the melting down step is 0.001 to 3 mm.

13. The method according to claim 11, wherein the melting down step is performed by using a beam of a $CO_2$ laser.

14. The method according to claim 11, wherein the temperature reduction rate per unit time for the cooling down step is $10^{10}$ to $10^{15}$ K/s.

* * * * *

UNITED STATES PATENT AND TRADEMARK OFFICE
CERTIFICATE OF CORRECTION

PATENT NO. : 6,402,476 B1
DATED : June 11, 2002
INVENTOR(S) : Hans-Peter Bossmann et al.

It is certified that error appears in the above-identified patent and that said Letters Patent is hereby corrected as shown below:

<u>Title page,</u>
Item [30], should read as follows:
--            Foreign Application Priority Data
Jul. 24, 1999        (DE) ....................... 199 34 856.1 --

Signed and Sealed this

Seventeenth Day of December, 2002

JAMES E. ROGAN
*Director of the United States Patent and Trademark Office*